(12) United States Patent
Al-Shammari

(10) Patent No.: US 8,731,892 B2
(45) Date of Patent: *May 20, 2014

(54) SYSTEMS AND PROGRAM PRODUCT FOR PERFORMING A FULLY AUTOMATED WORKFLOW FOR WELL PERFORMANCE MODEL CREATION AND CALIBRATION

(75) Inventor: Ahmad Tariq Al-Shammari, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 358 days.

This patent is subject to a terminal disclaimer.

(21) Appl. No.: 13/196,525

(22) Filed: Aug. 2, 2011

(65) Prior Publication Data

US 2013/0035919 A1 Feb. 7, 2013

(51) Int. Cl.
*G06G 7/48* (2006.01)
(52) U.S. Cl.
USPC .......................................................... 703/10
(58) Field of Classification Search
USPC .......................................................... 703/10
See application file for complete search history.

(56) References Cited

U.S. PATENT DOCUMENTS

| | | | |
|---|---|---|---|
| 5,873,049 A | 2/1999 | Bielak et al. | |
| 6,836,731 B1 | 12/2004 | Whalley et al. | |
| 7,424,415 B2 | 9/2008 | Vassilev | |
| 7,876,705 B2 | 1/2011 | Gurpinar et al. | |
| 2005/0015231 A1 | 1/2005 | Edwards et al. | |
| 2005/0119911 A1 | 6/2005 | Ayan et al. | |
| 2005/0173114 A1 | 8/2005 | Cudmore | |
| 2007/0016389 A1 | 1/2007 | Ozgen | |
| 2008/0120036 A1 | 5/2008 | Kimminau et al. | |
| 2008/0133194 A1 | 6/2008 | Klumpen et al. | |
| 2009/0254325 A1 | 10/2009 | Gokdemir | |
| 2009/0319243 A1 | 12/2009 | Suarez-Rivera et al. | |
| 2010/0042458 A1 | 2/2010 | Rashid et al. | |
| 2010/0191516 A1 | 7/2010 | Benish et al. | |
| 2010/0286971 A1 | 11/2010 | Middya et al. | |
| 2011/0022368 A1 | 1/2011 | Huang et al. | |
| 2011/0060572 A1 | 3/2011 | Brown et al. | |

OTHER PUBLICATIONS

A. Siu, "Re-Engineering the Well Calibration Procedure for a Large Number of High Productivity Wells," Proceedings of SPE Reservoir Simulation Symposium, Jan. 1, 2001, pp 1-9.
International Search Report and Written Opinion dated Jun. 27, 2013, for related PCT Application PCT/US2012/048337, 12 pages.
International Search Report and Written Opinion dated Jun. 27, 2013, for related PCT Application PCT/US2012/048316, 11 pages.

*Primary Examiner* — Hugh Jones
(74) *Attorney, Agent, or Firm* — Bracewell & Giuliani LLP; Constance G. Rhebergen; Denver S. Bisignano

(57) ABSTRACT

Systems and program product for creating and calibrating production and injection well models for a reservoir, are provided. An example of a system for creating and calibrating well models can include a well performance modeling computer and well performance modeling program product. The well performance modeling program product can include instructions that when executed by the well performance modeling computer cause the computer to perform operations including those for performing a comprehensive retrieval or gathering of required data components, feeding the gathered data into well performance software to thereby develop a model of the well, performing an initial calibration of the well model, performing a total system calibration on the well model, and performing a recalibration to fine tune the well model.

52 Claims, 8 Drawing Sheets

SYSTEMS AND PROGRAM PRODUCT FOR PERFORMING A FULLY AUTOMATED WORKFLOW FOR WELL PERFORMANCE MODEL CREATION AND CALIBRATION

RELATED APPLICATIONS

This application is related to U.S. patent application Ser. No. 13/196,567, filed on Aug. 2, 2011, titled "Methods For Performing A Fully Automated Workflow For Well Performance Model Creation and Calibration," incorporated by reference in its entirety.

BACKGROUND OF THE INVENTION

1. Field of the Invention

This invention relates in general to oil and gas recovery, in particular to the optimization of production and injection rates, and more specifically to systems, program product, and methods that provide improved well performance modeling, building, and calibration.

2. Description of the Related Art

An oil and gas reservoir is generally composed of porous and permeable rock which contains the oil and gas (and other hydrocarbons) in its pores. The oil and gas stored in the reservoir is prevented from reaching the surface due to an impermeable rock. The oil and gas within the reservoir can exert a substantial amount of vertical pressure on the impermeable rock. Portions of an oil and gas well can be run through the non-permeable rock to access the oil and gas in the reservoir. The typical oil and gas well can be thought of as a hole in the ground in which a steel pipe called a casing is placed. The annular space between the casing and the formation rock is filled with cement, ideally resulting in a smooth steel lined hole in the ground passing through the reservoir. In a process called completion, holes are generated in the casing at the reservoir depth to allow oil and gas to enter the well, and another smaller pipe hanging from the surface wellhead is added that allows the oil and gas to be brought to the surface in a controlled manner.

Well models are heavily used for production optimization, designing well completions, and creating well performance tables for reservoir simulation studies. Well production and injection modeling is a process practiced daily by many disciplines within the oil and gas industry. Petroleum engineers rely heavily on well modeling after analyzing and evaluating a wide range of data that influence well productivity to predict and optimize production and injection rates. Conventionally, many of the well modeling users do not follow a standard method in feeding the correct data into the simulator nor in the performance calibration step. The process is lengthy and subject to human input errors.

There can be significant benefits in modeling each well individually. Creating the individual well model, however, can be expected to require inputting and processing a considerably large amount of data usually scattered across entity databases. Once the well model is created, the predicted production and injection rates can be matched up against the field measured rates. The match can be attained by calibrating the models using, for example, a sensitivity analysis.

Conventionally, this well performance model creation and calibration process can be very lengthy and challenging, and is subject to human errors. The average time required to complete this task has been found to take up to 3-5 hours per well. The engineers' valuable time is mostly consumed by collecting/gathering the data, importing the data as necessary, and validating it, whereas such time should instead be used for design, analysis and decision making.

The data gathering and importing process involves dealing with several data components that need filtration, QC or validation before entering them into a well model, which is subject to human input error and inaccurate judgment. In addition, after building a well model, the calibration step is also subject to wrong, inaccurate or inefficient practices. Further, such process can result in a relatively long software license utilization time because the engineers normally leave the software running for many hours, especially when the process is interrupted for any reason.

Accordingly, recognized by the inventor is the need for systems, program product, and methods which can provide accurate, reliable and error-free well performance models that can be delivered in a timely manner. Also, recognized by the inventor is the need for systems, program product, and methods which can serve to eliminate the manual process of browsing and searching for multiple data components scattered in several database repositories and manually feeding them into well modeling software, which applies scientific techniques to build the well model and history match it, and which provides an interactive interface for customized calibration allowing users to override data used in model history matching and select the calibration parameters.

Further, recognized by the inventor is the need for systems, program product, and methods that addresses all of the above problems, that capture the "best practices" and experience of the engineers, and that provides a standardized scientific approach that essentially guarantees creating accurate and calibrated well models within a fraction of the time allotted according to conventional processes.

SUMMARY OF THE INVENTION

In view of the foregoing, various embodiments of the present invention advantageously provide systems, program product, and methods of managing hydrocarbon production, for example, through the creation and calibration of production and injection well models. Various embodiments of the present invention advantageously provide systems, program product, and methods of creating and calibrating the production and injection well models through comprehensive retrieval of all required data components and through the development and implementation of an optimal automated workflow.

According to various embodiments of the present invention, the systems, program product, and methods can provide accurate, reliable and error-free well performance models that can be delivered in a timely manner. The systems, program product, and methods can also serve to eliminate the manual process of browsing and searching for multiple data components scattered in several database repositories, and eliminate the tedious process of manually feeding them into well modeling software. The systems, program product, and methods can apply scientific techniques to build the well model and history match it, and can provide an interactive interface for customized calibration, allowing users to override data used in model history matching and select the calibration parameters. The systems, program product, and methods can capture the "best practices" and experience of the engineers, and provide a standardized scientific approach that can essentially guarantee creating accurate and calibrated well models within a fraction of the time required/allotted according to conventional processes.

More specifically, an example of a system for creating and calibrating production and injection well models for a reservoir includes a well performance modeling computer having a processor and memory in communication with the processor to store software therein, at least one, but more typically a plurality of databases stored in memory accessible to the well performance modeling computer but scattered across multiple locations, and well performance modeling program product stored in the memory of the well performance modeling computer to create and calibrate production and injection well models for a reservoir.

According to an exemplary embodiment, the program product includes instructions that when executed by the well performance modeling computer, cause the computer to perform various operations including gathering/importing well data for a well or wells to be modeled, feeding the gathered data into well performance software and/or modeling engine/module to thereby develop a model of the well, and performing a vertical flow correlation validation of a flow correlation used to model a pressure drop inside a well bore of the well to be modeled to thereby calibrate the flow correlation so that flowing bottom-hole pressure predicted using the flow correlation, for example, at the gauge depth, matches a corresponding field measured value.

The operations can also include performing a total system calibration on the well model. According to the exemplary configuration, the total system calibration includes a different set of procedures that are implemented when the well has a valid productivity index (PI) test with a performed date later than any well work-over date than are implemented when the well's PI test date is earlier than a well work over date for the well. For example, when the test date is later and when the model-predicted liquid rate is greater than the field measured liquid rate, the operation of decreasing the well productivity index value is performed. When the model-predicted liquid rate is, instead, less than the field measured liquid rate, the operation of modifying flow correlation parameters to increase the model-predicted liquid rate is performed. Alternatively, when the well does not have a valid productivity index test or has a productivity index test having a performed date earlier than a well work-over date for the well, the operation of determining a productivity index value that when applied to the well model results in a model-predicted liquid rate that at least substantially matches the field measured liquid rate, is performed.

The operations can also include providing a model recalibration interface configured to receive a user selection of a calibration parameter to be changed so that the model-predicted liquid rate better matches the field measured liquid rate. The model recalibration interface can include a plurality of user selectable parameter fields, such as, for example, a productivity index field and a correlation parameters field. The operation can also include calculating the well productivity index value that results in the model-predicted liquid rate at least substantially matching the field measured liquid rate in response to a user selecting the productivity index field. The operations can also include iteratively modifying a value of at least one of a plurality of calibration reference measurements until the model-predicted liquid rate at least substantially, but preferably exactly, within tolerances, matches the field measured liquid rate in response to user selection of the correlation parameters field. The operations can further include iteratively modifying a value of at least one of a plurality of calibration reference measurements while maintaining the well productivity index value in response to user selection of both the productivity index field and the correlation parameters field. The operations can also or alternatively include iteratively reperforming the total system calibration on the well model utilizing corresponding iteratively modified values of the at least one of the plurality of calibration reference measurements. The operations can still further include, for example, comprehensive computer-implementable data gathering steps according to various embodiments of the methods described below.

Note, although described with respect to the well performance modeling computer, various embodiments of the program product can be stored and delivered in a tangible computer readable medium which may or may not be associated with the well performance modeling computer.

As noted above, various embodiments of the present invention include methods for creating and calibrating production and injection well models for a reservoir. According to an example of an embodiment of a method, the method can include the steps of providing a video screen or other input tool to the user to facilitate user selection of a well to be modeled and performing a comprehensive retrieval of all required data components, which can include importing or otherwise gathering well data from at least one, but more typically, a plurality of entity databases. The method can also include feeding the gathered data into well performance software to thereby develop a model of the well, performing an initial calibration of the well model, performing a total system calibration on the well model, and optionally, performing a recalibration to fine tune the well model.

According to an embodiment of the method, the step of gathering well data can include gathering a plurality of rate test measurements from a well production or injection rate test recorded within, e.g., six months of each other. This can include gathering a set of at least three wellhead pressure (WHP) measurements, gathering a set of at least three gas oil ratio (GOR) measurements, gathering a set of, e.g., at least three percent water cut (WC %) measurements, and gathering a set of at least three liquid rate measurements. The steps can also or alternatively include determining an average wellhead pressure measurement value for the at least three wellhead pressure measurements, determining an average gas oil ratio measurement value for the at least three gas oil ratio measurements, determining an average percent water cut measurement value for the at least three percent water cut measurements, and/or determining an average liquid rate measurement value for the at least three liquid rate measurements.

According to an embodiment of the method, the step of gathering well data can also or alternatively include analyzing a plurality of pressure surveys conducted periodically on a plurality of wells in a field associated with the well to be modeled, and determining an average static reservoir pressure responsive to the analysis of the plurality of pressure surveys. According to an exemplary configuration, average static reservoir pressure are determined from one or more pressure surveys having a pressure survey date as close as capable to an associated well production or injection rate test and having a surveyed well location as adjacent as capable to that of the well to be modeled.

According to an embodiment of the method, the step of gathering well data can also or alternatively include providing a pressure-volume-temperature source selection criteria interface configured to receive a user selection of a source of pressure-volume-temperature test data used in generating the well model. The pressure-volume-temperature source selection criteria can include a plurality of user selectable pressure-volume-temperature selection criteria fields including a pressure-volume-temperature latest report date and source location option (first option field), a pressure-volume-temperature source based on well location option (second option field), and an external pressure-volume-temperature data option (third option field).

The first option field can include an input field providing user selection of a number of pressure-volume-temperature sources desired to be accessed. According to such configuration, the method further includes receiving a user input identifying user selection of the first option field and a user input indicating the user desired number of pressure-volume-temperature sources, and retrieving report data for a number of latest reports matching the number of user desired sources. According to this embodiment, the latest reports are the most recent reports retrieved for the user desired number of sources closest to the well to be modeled. According to an embodiment of the method, the steps can alternatively include modeling a plurality of wells each having a well area code, and retrieving latest report having a same well area code as the respective well for each of the plurality of wells responsive to user selection of the second option field.

According to an embodiment of the method, the step of gathering well data can include the steps of retrieving or importing wellbore description data including well profile, deviation survey, production tubing, and casing data, and the step of feeding the gathered data into well performance software can include feeding the wellbore description data into the well performance software. According to such configuration, the step of gathering well description data can further include the steps of retrieving a plurality of deviation survey point readings including a substantial number of measured depth versus true vertical depth readings, and filtering the plurality of deviation survey point readings to thereby select an optimal number of between approximately 6-8 survey readings based on deviation angle. Alternatively, when the well being modeled is substantially vertical, the step of filtering can include selecting an optimal number of between only approximately 2-3 survey readings.

According to an embodiment of the method, the step of gathering well data can also or alternatively include importing inside diameter and length data for each of at least substantially all tubing segments inside the wellbore of the well to be modeled. According to an exemplary configuration, the imported tubing segments only include those having a minimum length of, e.g., at least approximately 10 feet to thereby reduce data importation requirements.

According to an exemplary configuration, the step of gathering well data can also or alternatively include determining a minimum casing diameter and locating tubing packer depth to thereby identify at least substantially all casing sections being in contact with fluid, and importing data for only those casing sections determined to be in contact with fluid. According to an exemplary configuration, in order to reduce importation requirements, the imported casing sections data do not include casing section data for casing sections that are not in contact with fluid.

According to an exemplary configuration, the step of gathering well data can also or alternatively include determining the tubing outside diameter and casing inside diameter throughout each wellbore section having fluid flowing in an annular space therebetween for the well being modeled.

According to an embodiment of the method, the initial calibration of the well model can include performing a vertical flow correlation validation of a flow correlation used to model a pressure drop inside a well bore of the well to be modeled to thereby calibrate the flow correlation so that flowing bottom-hole pressure predicted using the flow correlation at the gauge depth matches a corresponding field measured value.

According to an embodiment of the method, the total system calibration can include providing well performance data to a simulator, receiving a model-predicted liquid rate, and determining if a difference between the model-predicted liquid rate and corresponding field measured liquid rate is within a preselected value. The step of providing well performance data to a simulator can include providing average rate test conditions to the simulator to calculate the model-predicted liquid rate. The rate test conditions include wellhead pressure (WHP), gas oil ratio (GOR), and/or percent water cut (WC %) measurements. The average of each of the rate test conditions, rather than individual measurements, is provided to reduce an effect of measurement outliers when present.

According to an exemplary configuration, when the well has a valid productivity index (PI) test with a performed date later than any well work-over date for the well, the steps can include decreasing a well productivity index value when the model-predicted liquid rate is greater than the field measured liquid rate, or modifying flow correlation parameters to increase the model-predicted liquid rate when the model-predicted liquid rate is less than the field measured liquid rate. The step of decreasing the well productivity index value can include incrementally reducing the productivity index and recalculating the model-predicted liquid rate until an absolute error therebetween is within a preselected value of, for example, approximately ±5% or as otherwise selected.

Alternatively, when the well does not have a valid productivity index test or its latest productivity index test has a performed date earlier than the well work-over date for the well, the steps can include determining a productivity index value that when applied to the well model, results in a model-predicted liquid rate that at least substantially matches the field measured liquid rate.

According to an embodiment of the method, the steps can also includes providing a model recalibration interface configured to receive a user selection of a calibration parameter to be changed so that the model-predicted liquid rate better matches the field measured liquid rate. Advantageously, this option allows a user to change one or more of the calibration reference measurements, such as, for example, wellhead pressure (WHP), gas oil ratio (GOR), mass flow (Ql), and static bottom hole pressure (SBHP), and repeat the calibration process.

According to an exemplary configuration, the model recalibration interface includes a plurality of user selectable parameter fields to include a productivity index field and a correlation parameters field. The steps can include calculating the well productivity index value that results in the model-predicted liquid rate at least substantially matching the field measured liquid rate in response to a user selecting the productivity index field. The steps can include iteratively modifying a value of at least one of a plurality of calibration reference measurements until the model-predicted liquid rate at least substantially matches the field measured liquid rate in response to user selection of the correlation parameters field. Additionally, according to an exemplary embodiment, the step of iteratively modifying a value of at least one of a plurality of calibration reference measurements is performed while maintaining the well productivity index value during performance of the iterative modifications in response to user selection of both the productivity index field and the correlation parameters field. The steps can also or alternatively include iteratively reperforming the total system calibration on the well model utilizing corresponding iteratively modified values of the at least one of the plurality of calibration reference measurements.

Various embodiments of the present invention advantageously establish a new era in the normal practices of well performance modeling. Various embodiments of the present invention enable petroleum engineers to create and calibrate thousands of well models within a fraction of the time they would normally spend—completing a portion of a process that normally consumes an average of 4 hours of an engineer's time in less than as little as approximately 6-7 seconds per well model. For example, where the required time to create, update, and/or calibrate 6500 well models is approximately 26,000 hours using conventional processes (based on an average of 4 hours per well), the expected amount of time needed to perform the creation, update, and/or initial calibration steps utilizing one or more embodiments of the present invention is approximately 11 hours (based on an average of 6 seconds per well). Advantageously, such improved performance is expected to yield an annual savings of 25,989 man-hours.

Various embodiments of the present invention gather state of the art techniques and expertise and combine them in an automated system that considerably improves the quality of well performance models. Various embodiments of the present invention eliminate the manual process of browsing and searching for multiple data components scattered in several, e.g., Oracle, database repositories and manually feed them into well modeling software.

Various embodiments the present invention collect state-of-the-art human expertise in the field and incorporate it in a system that can generate the highest of quality well models, apply scientific techniques to build the well model and history match it, and provide an interactive interface for customized calibration, allowing users to override data used in model history matching and select the calibration parameters.

Various embodiments of the present invention provide systems, software (program product) and methods designed to perform the following high-level operations/steps: providing user selection of a well to be modeled, gathering well data from a plurality of databases, feeding the gathered data into well performance software, performing a vertical flow correlation validation, comparing predicted well performance with actual measured well performance, and performing a calibration on parameters utilized to develop the model based on the comparison.

Various embodiments the present invention provide a system including program product and related methods which provide an automated workflow for creating production and injection well models by comprehensive retrieval of all data components stored in the corporate database. After the well models are created, the system runs a scientific calibration process on each well model to match their individual performances with field measurements. Eventually, the production conditions are displayed in an interactive portal through which the well performance can be evaluated using different conditions.

Various embodiments of the present invention provide systems, program product, and methods which incorporate a workflow including the steps of importing fluid properties data and fine-tuning the pressure volume time (PVT) Black-Oil correlation, importing productivity index (PI) well testing and average reservoir pressure data, importing wellbore description data (deviation survey and tubing/casing details), importing field measured production or injection conditions and flow rate data, feeding the input data into well performance modeling software, running a vertical flow correlation validation, running well performance modeling and capturing the predicted rate by the software, comparing the predicted rate and the measured rate and performing calibration on PI or flow correlation parameters, and providing tools for a user to perform a recalibration and sensitivity analysis.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 7 is a schematic diagram of a graphical user interface illustrating examples of data utilized according to an embodiment of the present invention; and FIG. 8 is a schematic diagram of a graphical user interface illustrating calibration parameter selection according to an embodiment of the present invention.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Various embodiments of the present invention can serve to eliminate the manual process of browsing and searching for multiple data components scattered in multiple database repositories and manually feeding them into well modeling software. Such embodiments can also serve to apply scientific techniques to build the well model and history match it, and to provide an interactive interface for customized calibration allowing users to override data used in model history matching and select the calibration parameters.

Figure 1:
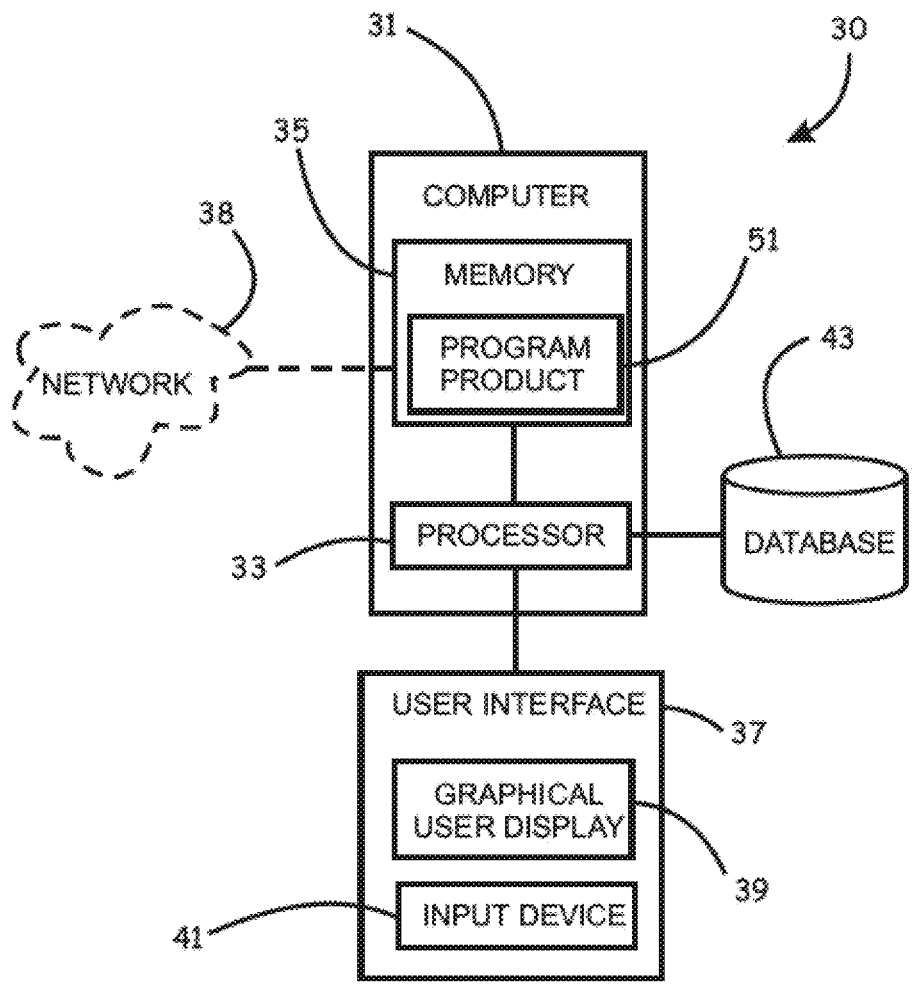
FIG. 1 is a schematic diagram of a general system architecture of a system for creating and calibrating production and injection well models according to an embodiment of the present invention.

FIG. 1 provides an example of an embodiment of a system 30 for managing hydrocarbon production, for example, through the creation and calibration of production and injection well models. The system 30 can include a well performance modeling computer 31 having a processor 33, memory 35 coupled to the processor 33 to store software and database records therein, and a user interface 37 which can include a graphical display 39 for displaying graphical images, and a user input device 41 as known to those skilled in the art, to provide a user access to manipulate the software and database records. Note, the computer 31 can be in the form of a personal computer or in the form of a server or server farm serving multiple user interfaces 37 and/or providing multiple disparate functions or other configurations known to those skilled in the art. Accordingly, the user interface 37 can be either directly connected to the computer 31 or indirectly connected through a network as known to those skilled in the art, such as, for example, network 38.

The system 30 can also include a database 43 stored in the memory 35 (internal or externally assessable) of the well performance modeling computer 31. The database 43 can include data indicating: general well data such as, for example, well location (X-Y coordinates), well reservoir, lifting mechanism (ESP or naturally flowing), and well configuration (single branch or multilateral), etc. The database 43 can also include pressure volume time (PVT) test report and fluid properties data; and wellbore description data including deviation survey data, tubing details data, and casing details data. The database 43 can also include average static reservoir pressure data for a selected number of wells; well productivity index (PI) testing reports data including the well formation PI, wellhead flowing conditions, and bottom hole flowing conditions; well work-over data; and well production and index rate test report data, along with others as recognized by those of ordinary skill in the art. Note, although referred to as a single database 43, database 43 can comprise a plurality of databases stored on a plurality of geographically/positionally separate data storage devices (not shown).

The system 30 can also include well performance modeling program product 51 stored in memory 35 of the well performance modeling computer 31. Note, the well performance modeling program product 51 can be in the form of microcode, programs, routines, and symbolic languages that provide a specific set for sets of ordered operations that control the functioning of the hardware and direct its operation, as known and understood by those skilled in the art. Note also, the well performance modeling program product 51, according to an embodiment of the present invention, need not reside in its entirety in volatile memory, but can be selectively loaded, as necessary, according to various methodologies as known and understood by those skilled in the art.

Figure 2:
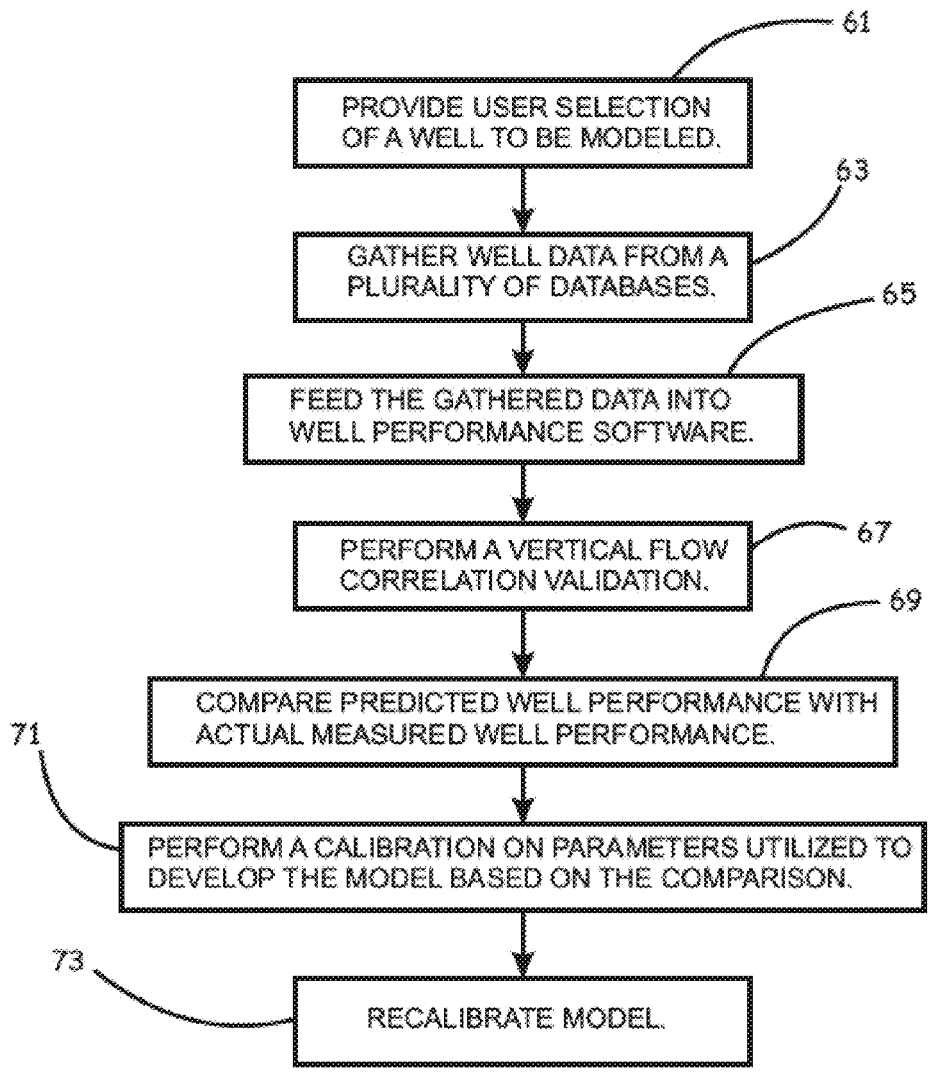
FIG. 2 is a schematic flow diagram illustrating steps for creating and calibrating production and injection well models according to an embodiment of the present invention.

FIG. 2 provides a flow diagram illustrating steps for performing well performance model creation and calibration. The high-level steps can include providing user selection of a well to be modeled (block 61), gathering/importing and processing well data from a plurality of databases (block 63), feeding the gathered data into well performance software (block 65), performing a vertical flow correlation validation (block 67), comparing predicted well performance with actual measured well performance (block 69), performing a calibration on parameters utilized to develop the model based on the comparison (block 71), and performing an assisted recalibration on the model (block 73).

Well Selection

Figure 3:
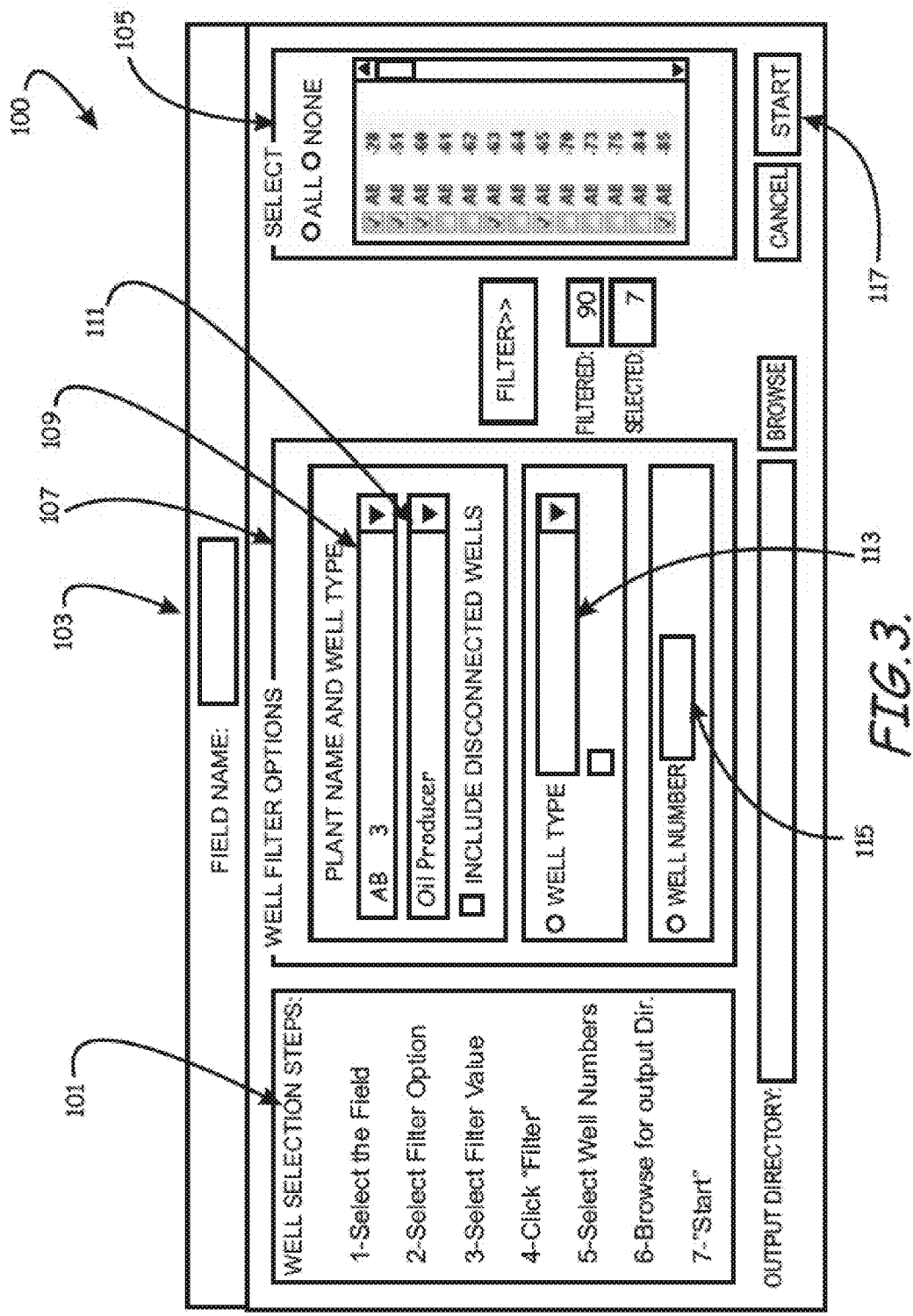
FIG. 3 is a schematic diagram of a graphical user interface for selecting the well bore wells to be modeled according to an embodiment of the present invention.

FIG. 3 illustrates a well selection screen (graphical interface) 100, according to an embodiment of the system 30, that locates all active wells in the corporate database 43 for user selection. The screen 100 includes a "well selection steps" information table 101 providing a well selection order to a user, a reservoir field name drop-down menu 103, and a reservoir field section code selection menu 105. After selecting the reservoir field code, several filtration options in a "well filter options" section 107 are provided to assist in locating the looked-for wells. These include, for example, a "plant name" drop-down menu 109 and a "well type" drop-down sub-menu (e.g., oil producer, gas producer. etc.) 11, a "well type" drop-down menu 113, and a "well number" (single well selection) drop-down menu 115. Note, as with other menus described herein, it should be understood that various graphical presentation tools can be utilized as recognized by one of ordinary skill in the art.

Figure 4:
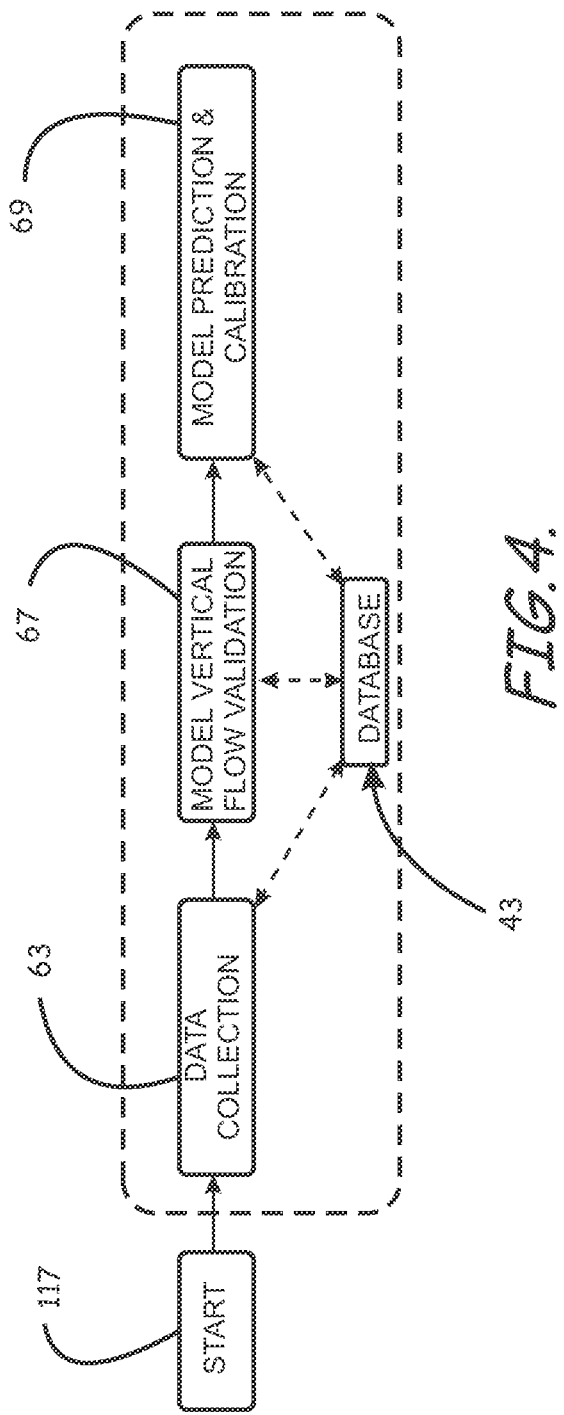
FIG. 4 is a schematic data flow diagram illustrating data flow according to an embodiment of the present invention.

As perhaps best shown in FIG. 4, once the user selects the required wells for well performance modeling and calibration, the exemplary process is started by pressing the "Start" button 117.

The workflow, according to the exemplary embodiment of the present invention, includes, for example, the following steps:

Gathering/Importing and Processing Data

Figure 5:
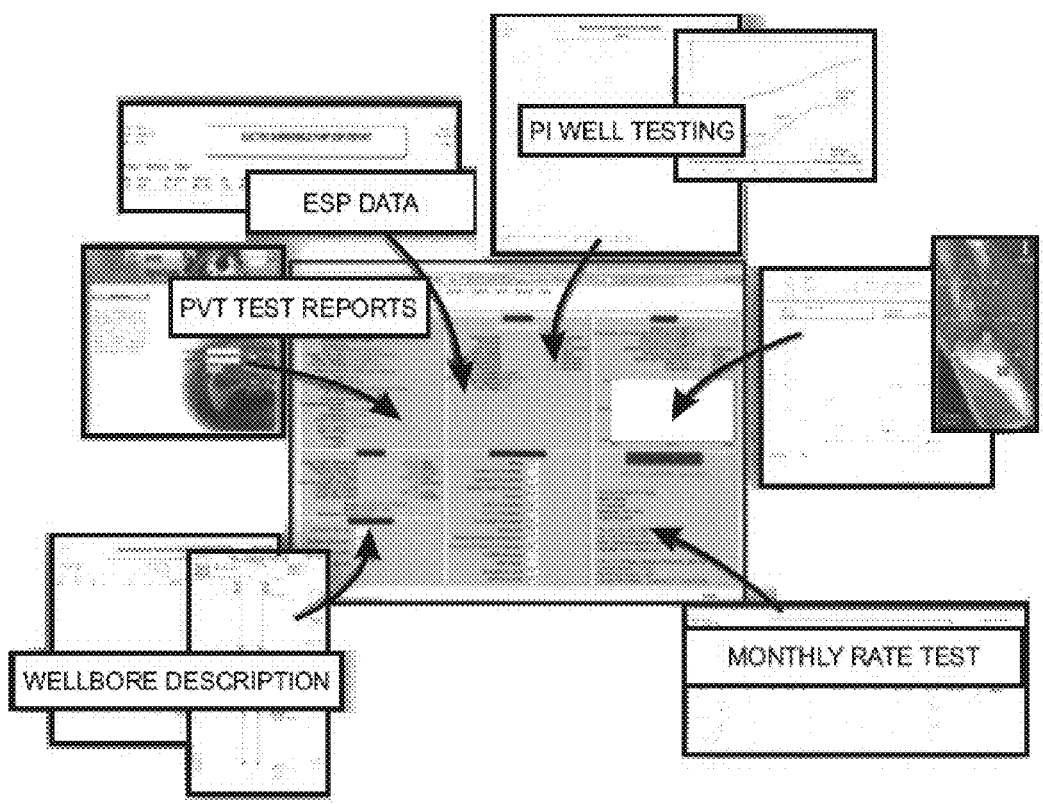
FIG. 5 is a schematic diagram illustrating comprehensive data gathering according to an embodiment of the present invention.

As perhaps best shown in FIG. 5, the process can include gathering data including "General Well data," "Pressure-Volume-Temperature (PVT) Source Selection and Fluid Properties," "Wellbore Description," and "Average Static Reservoir Pressure," among others, across multiple corporate databases. According to an exemplary configuration, a robot is provided to gather data as the data is updated, typically according to user settings. According to another configuration, the data is gathered on demand. According to another configuration, some portions of the data are gathered automatically, and other portions are gathered on demand in response to user selected settings.

General Well Data

The general well data includes, for example, the following items: well location (X-Y coordinates), current reservoir, electrical submersible pump (ESP) assisted or naturally flowing, single branch or multilateral, among others. ESP data can include depth, number of stages, power, model, etc.

PVT Source Selection and Fluid Properties

Figure 6:
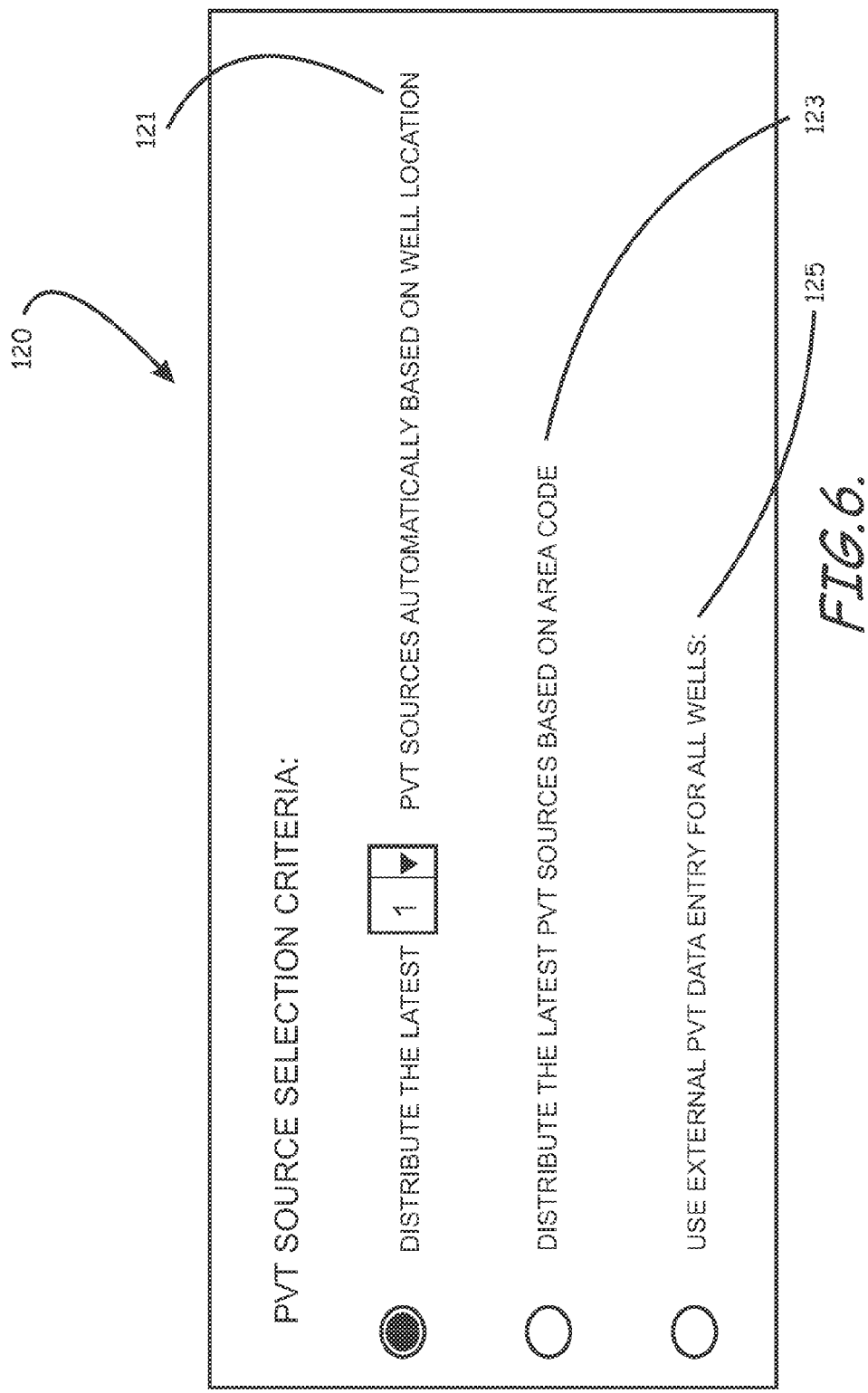
FIG. 6 is a schematic diagram of a graphical user interface for selecting a pressure-volume-temperature source criteria according to an embodiment of the present invention.

PVT reports are generated after collecting fluid samples from a selected number of wells in the field. According to an exemplary configuration, it is preferable to select a recent PVT sampling report from the same well or an adjacent one. However, due to the scarcity in PVT test reports, as shown in FIG. 6, according to the exemplary configuration, the user is provided a "PVT source selection criteria" interface/screen 120 to make a spatial-temporal reasoning by either selecting the latest report in the field regardless of the well location or the closest PVT report to the well under consideration regardless of the date.

For that decision to be received, according to the exemplary configuration, the PVT source selection criteria screen 120 is designed to offer three PVT source selection options. For example, the first option shown at 121 provides the user the ability to consider both the PVT report date and the source location. If the user selects this option and sets the number of latest PVT source to, e.g., "1" as shown, the most recent PVT test report will be used for all generated wells regardless of the location. When there are abundance of the recent PVT sources, a larger weight can be put to the location by selecting the number of more recent reports (based on the test/report date) to be selected and allowing the system/program product to match wells with PVT sources based on location.

The $2^{nd}$ option shown at 123 provides the user a module interface which allows the user to consider feeding PVT data from PVT reports taken from the latest test/report date with the same well area code. Alternatively, the $3^{rd}$ option shown at 125 provides the user a module interface which allows the user to feed the PVT data from an external source.

Once the PVT report selection criteria is defined, the application starts importing the PVT data according to the user-establish criteria. The PVT data imported from, e.g., an entity Oracle database are: bubble point pressure (Pb), oil viscosity at Pb, oil formation volume at Pb, solution GOR at Pb, gas specific gravity, oil API gravity, H2S, CO2, N2, Rs, Water SG, reservoir temperature ($T_{res}$), and $FVF_{@Pb}$. Additionally, the water salinity value retrieved from water analysis reports is also imported.

Wellbore Description

As part of the automated data importing/gathering process, wellbore description data is gathered and processed. The wellbore description includes well profile along with deviation survey, production tubing, and casing details.

Deviation survey. The deviation survey is generally available in the database as a large number of measured depth (MD) vs. true vertical depth (TVD) readings. It has been determined by the inventor that in non-vertical wells, preferably between 6-10, and more preferably 8 deviation survey readings based on the deviation angle are sufficient to describe the well profile. As such, according to the exemplary figuration, the system/program product automatically filters all the deviation survey points and selects the desired 8 MD/TVD readings. Note, it has been similarly found that if the well is instead vertical, then two readings have been found to be sufficient. Providing the automated filtering can beneficially reduce computer/software processing time.

According to an exemplary process of selecting the desired points, the following steps are followed:

| | |
|---|---|
| Point 1: | The process starts with a wellhead survey: MD, TVD = 0.0. |
| Point 2: | The next step is to define the first kick-off point. This point is defined once the deviation angle reaches 5° and is increasing. |
| Point 8: | The process goes to the maximum depth survey and reaches the maximum deviation angle. |
| Points 3-7: | Points 3-7 are then selected based on the deviation angle increments, e.g., {(maximum angle minus 5°)/5} |

Tubing details. According to the exemplary configuration, the system/program product imports the inside diameters, lengths, and depths for all tubing segments inside the wellbore of the selected wells. Tubing details tables available in the database contain the description of the main production tubing along with a large number of short tubing segments such as, for example, tubing accessories, fittings and connections. It has been found to be inefficient by the inventor to import all these devices, especially when they have negligible impact on flow performance. As such, according to the exemplary configuration, the system/program product imports tubing segments with minimum length of approximately 10 ft. Note, although utilization of an alternative minimum length is within the scope of the present invention, it has been found that tubing segments having smaller tubing lengths can have a negligible impact on pressure drop. Accordingly, their application would consume resources with a disproportionate or negligible benefit. Using a significantly higher minimum tubing length, however, can result in additional error.

Casing details. According to the exemplary configuration, the system/program product imports only the casing sections of the selected well bore wells that are in contact with fluid. The selection process requires identifying such casing sections. In the exemplary configuration, the identification of which of the casing sections are in contact with fluid is made by performing the steps of determining the minimum casing diameter and locating the tubing packer depth—which provides adequate criteria. If the well is flowing in the annular space or in both annulus and tubing, according to the exemplary configuration, the system/program product locates the tubing outside diameter and the casing inside diameter throughout the whole wellbore section to perform the identification. According to an exemplary configuration, the imported data can include casing inside diameters, lengths, and depths.

Average Static Reservoir Pressure Modified at Completion End

Static reservoir pressure is one of the basic data that has been found to have a major impact on well performance and to provide enhanced performance. As such, in order to provide enhanced performance, according to the exemplary configuration, its value must be entered/recorded accurately. Pressure surveys are usually conducted periodically on a selected number of wells in the field. The pressure survey date has also been found by the inventors to be as important factor in providing enhanced performance. Specifically, according to the exemplary configuration, the pressure survey date should be as close as possible to the date of the well rate test and the surveyed well location should be as adjacent as possible to the well under consideration. Accordingly, the system/program product identifies and stores the dates accordingly. According to an embodiment of the system/program product, a "static reservoir pressure criteria" interface/screen (not shown) similar to that of the "PVT source selection criteria" screen 120 allows the user to indicate the number of adjacent wells to thereby select the latest report based on well location.

Well Productivity Index (PI) Testing Data

PI testing reports data is also gathered. PI testing reports usually include the well formation productivity index in addition to wellhead and bottom-hole flowing conditions. According to the exemplary configuration, the PI value, if determined to be valid, is used in modeling the inflow performance relationship and the flowing data is used in the vertical flow correlation validation. The PI test date is also important and should be compared with the well work-over date to determine its validity. Additionally, if a work-over job is performed on the well after the well PI test date, then the PI value from the respective test will not be considered for validating the vertical flow correlation as the well conditions may have changed. Further according to the exemplary configuration, if no valid PI value is available, a default value can be automatically prescribed.

Well Production or Injection Rate Test

For calibration purposes, according to the exemplary configuration, the process also includes importing the latest rate test conditions for the well under consideration. Field measurements, however, sometimes can include errors or non-realistic measurements. For example, the production should increase if the wellhead pressure decreases. When both wellhead pressure and rate have increased compared to the previous test, then there must be an error. Such measures, however, are generally flagged with a "good" indicator in the database. Accordingly, substantial errors can be introduced if only the last reading of pressure and rate are feed it to the modeling software. This applies also to GOR and WC % values.

In order to avoid the effect of such measurement outliers, the program collects a preselected number, e.g., 3, of the latest rate test measurements, provided they are within a preselected time period, e.g. 6 months, and the calibration process is run against the averaged conditions. The recent production data imported for calibration can include liquid rate, well head pressure, water cut and gas oil ratio (GOR). Well testing flowing data (historical data for VLP validation) can include pressure gauge depth, flowing bottom hole pressure, wellhead flowing pressure, GOR, and water cut percentage.

Beneficially, when an "averaged" case is introduced, the process reduces the effect of the "suspicious" readings and adds robustness to the model. It has been found that two readings are generally not enough to remove the effect of the erroneous measurement. Accordingly, according to the exemplary configuration, the process uses the latest three points. Notably, three points have been found to be optimal as using more than three points (four or more) can result in the incorporation of older conditions that may disturb the model consistency. By limiting the data used to three points according to the exemplary configuration, it has been determined that it is unlikely that such latest conditions will reflect old readings to the extent that the averaged conditions will be significantly affected. Nevertheless, the exemplary configuration includes the, e.g., six, months time limitation condition.

Feeding the Data into the Well Performance Software

According to the exemplary configuration, the well performance modeling software/program product is driven and communicated automatically using an external program, which also allows for data input and extraction. An example of such external program is named "Prosper," which is a vendor application developed by Petroleum Experts www.petex.com. Other engines capable of performing the same functions, including, for example, an engine incorporated into program product 51 according to an alternative embodiment of the present invention, can be utilized.

Vertical Flow Correlation Validation

Figure 7:
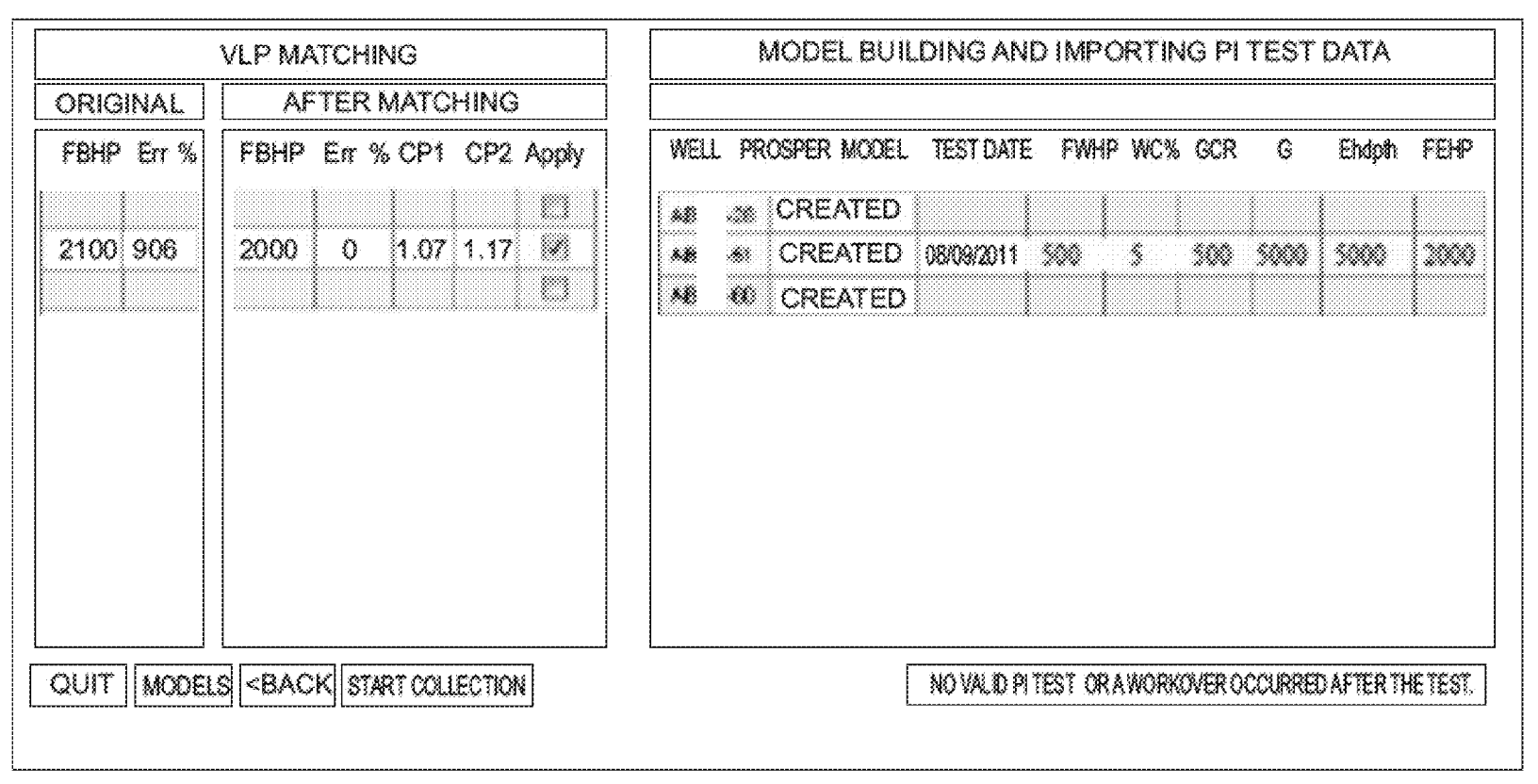

The pressure drop inside the wellbore can be calculated using multi-phase flow correlations. Particularly, according to the exemplary configuration, flowing well test conditions are used in order to validate and fine-tune the performance of the selected flow correlation. Initially, the rows displayed in FIG. 7 will be empty and will be filled one by one, for example, to indicate that the input data has been loaded into the model building software. According to an exemplary configuration, the process utilizes default values (determined through industry analysis) to provide correlation selection criteria. According to an alternative configuration, the vertical flow correlation validation step includes providing a user a graphical interface (not shown) to allow a user selection of a correlation from a drop-down list or other access means.

According to the exemplary configuration, the correlation performance can be modified by applying gravity and friction correction factors so that the flowing bottom-hole pressure predicted by the correlation at the gauge depth matches the measured value. Note, the corrected values would not be expected to match if the well had a work-over job after the well test date. As such, according to the exemplary configuration, the flow correlation will be used without validation. Later on, the correlation parameters can be changed to match the production rate based on a criterion described later. After the flow correlation is fine-tuned, the vertical flow modeling can be considered reliable and the well model is ready for the total system calibration, described below.

Model Initial Calibration

Performing a well model calibration step is essential before relying on the model in any study and design analysis. The calibration process is carried out by sending, for example, the latest average rate test conditions (WHP, GOR and WC%) to the simulator to calculate the liquid rate. According to the exemplary configuration, the well model will be considered valid if the difference between the predicted and measured liquid rate is within approximately 5%. Otherwise, the calibration process will start as follows:

Case 1: The well has a "Valid" PI test not followed by a work-over.

Case 1.a: The model-predicted liquid rate is greater than the measured liquid rate.

In this case, according to the exemplary configuration, it is assumed the formation started developing skin or damage and the total PI can be decreased. The system/program product will start incrementally reducing the PI and recalculating the rate until the absolute error is within plus or minus 5%.

Case 1.b: The model-predicted liquid rate is less than the measured liquid rate.

In this case, according to the exemplary configuration, the system/program product will not increase the PI. Instead, the vertical flow performance modeling is considered questionable. As such, the system/program product will modify the flow correlation parameters to increase the predicted rate until the absolute error is within plus or minus 5%. Further according to the exemplary configuration, if the new correlation coefficients reaches 0.5, however, then the calibration process stops and the well will be highlighted in, e.g., red, which indicates a problem in the input data.

Case 2: The well does not have a Valid PI test or the latest test was followed by a work-over.

In this case, according to the exemplary configuration, the system/program product will focus on finding the PI value to match between the model and the field measurements.

It should be understood by one of ordinary skill in the art that absolute error tolerance values other than 5% can be utilized. However, significant benefits have been found by using such value. This tolerance value was set as it was determined that the value would cover the in-accuracy introduced by the flow correlation performance or by any of the input data such as PI, SBHP or PVT. Using a smaller tolerance has been found to result in forcing the model to match tightly by changing the inflow PI value or the outflow correlation factors, although this difference could be caused by any input data in the model itself. The 5% tolerance was, therefore, chosen as an acceptable value for engineering purposes.

Model Recalibration

Figure 8:
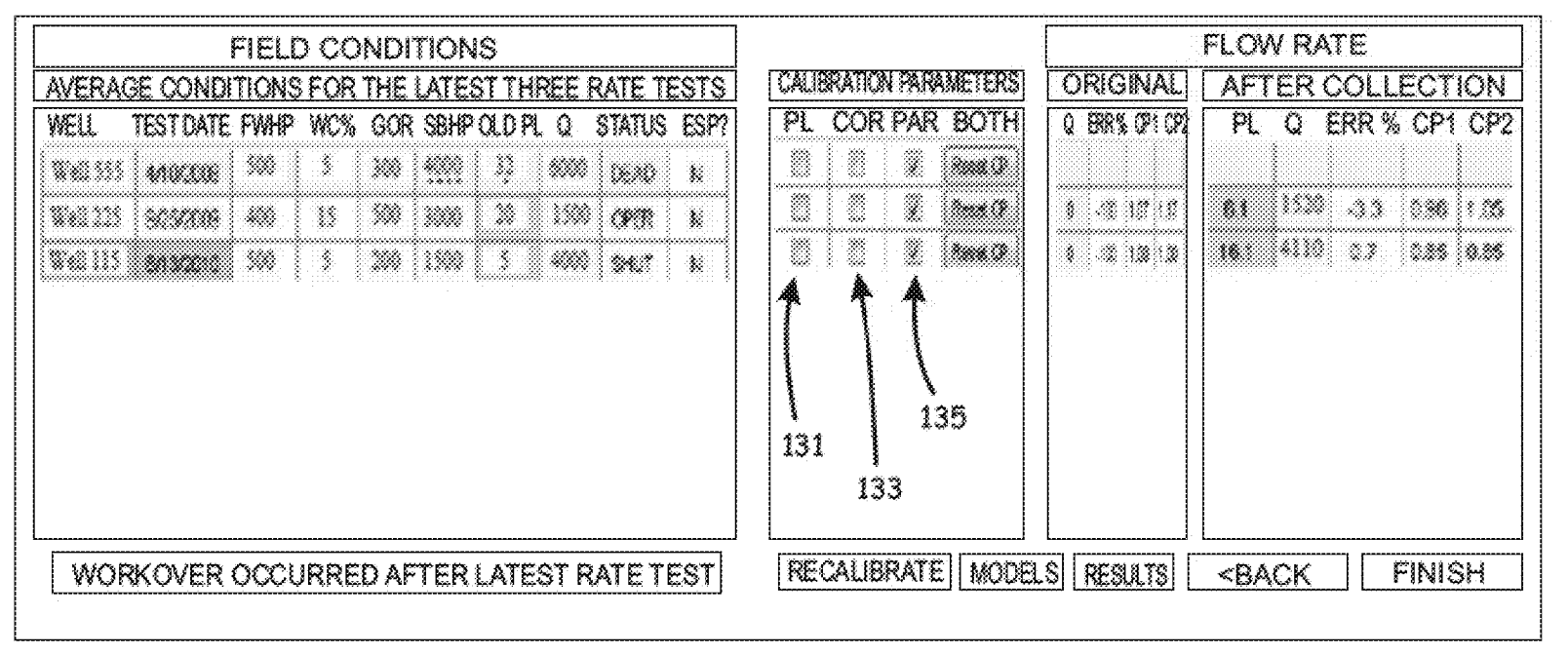

This option can be considered a post calibration process. The model recalibration allows the user to change one or more of the calibration reference measurements (WHP, GOR, WC, Ql, SBHP or PI) and repeat the calibration process. In this process, the user is provided with the ability to select the calibration parameter that can be changed by the system/program product to meet the measured rate. For example, as illustrated in FIG. 8, the user can select "PI" at 131 which will calculate the PI required for matching. The user can alternatively select "correlation parameters" at 133, which will honor the PI value and modify the correlation parameter until matching is reached. Additionally, the user can further alternatively select "both" at 135, which will consider/execute the same procedure as described with respect to the initial model calibration process.

The following table provides a brief comparison of some major features (according to an exemplary configuration) with related features found in a typical conventional system. It should be understood that such features are not the only major features of the exemplary configuration or of the various embodiments of the present invention, but rather, provide comparative highlighting found to be beneficial to understanding. Various "values" utilized in the table provide a specific example and should not be considered limiting to the described features that the values relate to.

| Data input or modeling step | Typical Conventional system | Exemplary system |
| --- | --- | --- |
| PVT report source | Uses the same well or an adjacent well without considering the date. | Enables selecting the most recent PVT source in the field that is close to the well. |
| PVT data input | Uses basic PVT data and uses the original PVT correlations. | Uses additional PVT data used for fine-tuning the PVT correlation performance. |
| Reservoir pressure | Uses pressure survey data taken from the same well without considering the date. The pressure at completion end could be taken directly from the pressure survey, which is at datum depth. | Survey taken from the same well only if it is within, e.g., a three month time difference from rate test. Pressure surveys from, e.g., three adjacent wells are used to build a 3D extrapolation equation to predict the pressure at well location. Pressure is calculated at the completion end by using the pressure gradient. |
| VLP Validation | The user uses the well testing for VLP validation without checking the well history. | The exemplary system only uses well testing data for VLP validation if there was no work-over performed after the well testing date |
| Well Calibration | There is no standard way for calibration. The user may use only the PI to match. The process is tedious and very long. | A new standard approach is provided. The process is quick and iterative. The PI calculation uses, for example, numerical convergence techniques to speed up the iteration process. |
| Model Re-Calibration | One needs to go to the well model and enter the new data one-by-one. | An interactive screen is designed to facilitate automated calibration and to provide quality assurance during the automated process. |

It is important to note that while the foregoing embodiments of the present invention have been described in the context of a fully functional system and process, those skilled in the art will appreciate that the mechanism of at least portions of the present invention and/or aspects thereof are capable of being distributed in the form of a computer readable medium in a variety of forms storing a set of instructions for execution on a processor, processors, or the like, and that embodiments of the present invention apply equally regardless of the particular type of media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, digital and analog communication links capable of storing the set of instructions. Such media can contain, for example, both operating instructions and the operations instructions described with respect to the program product 51, and the computer executable portions of the method steps according to the various embodiments of a method of creating and calibrating production and injection well models to include implementing a workflow to create and calibrate the production and injection well models for a reservoir, described above.

Various embodiments of the present invention provide several unique advantages. For example, conventionally well modeling users generally do not follow a standard method in feeding the correct data into a well simulator, nor follow standard procedures in a performance calibration step, making the process lengthy and subject to human input errors. Various embodiments of the present invention, however, have been shown to employ a unique standardized methodology which allows the system to complete a data gathering process across multiple databases, which normally consumes an average of 4 hours of an engineer's time, in less than approximately seven seconds. According to an exemplary implementation, an embodiment of the present invention was used to create a total of 284 well models with an average time required to complete the task being approximately 33 minutes. The well models were then used in building surface network models of four gas oil separation plants (GOSPs) and providing accurate total system flow rate.

Various embodiments of the present invention advantageously collect conventional and unconventional human expertise in the hydrocarbon production field and apply it in systems that generates the highest of quality well models. Various embodiments of the present invention can automatically build and calibrate well models from a database and provide methodologies that solve issues related to the manual process of well performance model building and calibration. Various embodiments of the present invention can advantageously eliminate the manual process of browsing and searching for multiple data components scattered in several, e.g., Oracle, database repositories and the process of manually feeding them into well modeling software. Various embodiments of the present invention advantageously apply scientific techniques to build the well model and history match it, and provide an interactive interface for customized calibration allowing users to override data used in model history matching and to select the calibration parameters.

Various embodiments of the present invention advantageously provide new systems that streamline and automate an integrated workflow for well model building and calibration, which can capture experiences and "best practices" in the area of well performance modeling, and apply them in an automated system. Advantageously, the workflow can, for example, import fluid properties and fine-tune PVT Black-Oil correlation, import PI well testing data and average reservoir pressure, import wellbore description (deviation survey and tubing/casing details), import field measured production or injection conditions and flow rate, feed input data into well performance modeling module or standalone software, run a vertical flow correlation validation, run well performance modeling and capture the predicted rate by the module/software, compare predicted rate and measured rate and perform calibration on PI or flow correlation parameters, and provide a user interface to allow a user to perform re-calibration and sensitivity analysis.

Various embodiments of the present invention provide enhanced quality based upon criteria including a determination that the subject well has: a recent PVT test report stored in a reference database, a recent valid well PI test stored in the database, a pressure survey having the same date as that of the surface rate test, three recent rate test conditions that are accurate and validated, a produced gas oil ratio (GOR) that is close to the solution gas oil ratio (Rs) measured in the laboratory, and if the well is equipped with an ESP, a pump model for the ESP is available in the well modeling software.

This application is related to U.S. patent application Ser. No. 13/196,567, filed on Aug. 2, 2011, titled "Methods For Performing A Fully Automated Workflow For Well Performance Model Creation and Calibration," incorporated by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

The invention claimed is:

1. A system for creating and calibrating production and injection well models for a reservoir, the system comprising:
   a well performance modeling computer having a processor and memory in communication with the processor to store software therein;
   at least one database stored in memory accessible to the well performance modeling computer; and
   a well performance modeling program stored in the memory of the well performance modeling computer to create and calibrate production and injection well models for a reservoir, the program including instructions that when executed by the well performance modeling computer cause the computer to perform the operations of:
   performing a vertical flow correlation validation of a multi-phase flow correlation used to model a pressure drop inside a well bore of a well to be modeled to include calibrating the multi-phase flow correlation so that flowing bottom-hole pressure predicted using the flow correlation at gauge depth matches a corresponding field measured flowing bottom hole pressure value to thereby develop a well model of the well,
   comparing a performed date of a valid productivity index (PI) test for the well to a latest work-over date for the well, and
   performing a total system calibration on the well model including:
      decreasing a well productivity index value for the well model responsive to a model-predicted liquid rate for the well is greater than a field measured liquid rate for the well and responsive to the valid productivity index (Pt) test having a performed date being later than any well work-over date for the well to thereby adjust the model-predicted liquid rate, so that the model-predicted liquid rate is within a preselected value of the field measured liquid rate, and
      modifying flow correlation parameters for the well model to increase the model-predicted liquid rate responsive to the model-predicted liquid rate being less than the field measured liquid rate and responsive to the valid productivity index test associated therewith having the performed date being later than any well work-over date for the well to thereby adjust the model-predicted liquid rate, so that the model-predicted liquid rate is within the preselected value of the field measured liquid rate, performed without significantly adjusting the well productivity index value.

2. A system as defined in claim 1, wherein the operation of performing a total system calibration on the well model includes:
   providing well performance data to a simulator;
   receiving a model-predicted liquid rate; and
   determining if a difference between the model-predicted liquid rate and corresponding field measured liquid rate is within the preselected value.

3. A system as defined in claim 1, wherein the operation of performing a total system calibration on the well model includes:
   providing well performance data to a simulator;
   receiving a model-predicted liquid rate;
   determining if a difference between the model-predicted liquid rate and corresponding field measured liquid rate is within the preselected value; and
   determining a productivity index value that when applied to the well model results in a model-predicted liquid rate that at least substantially matches the field measured liquid rate, performed when the well does not have a valid productivity index test associated therewith or has a productivity index test having a performed date earlier than a well work-over date for the well.

4. A system as defined in claim 1, wherein the operation of decreasing a well productivity index value includes:
   incrementally reducing the productivity index value and recalculating the model-predicted liquid rate until an absolute error between the model-predicted liquid rate and the field measured liquid rate is within the preselected value.

5. A system as defined in claim 4, wherein the absolute error is within approximately ±5%.

6. A system as defined in claim 1, wherein the operations further comprise:
   providing a model recalibration interface, the model recalibration interface configured to receive a user selection of a calibration parameter to be changed so that the model-predicted liquid rate better matches the field measured liquid rate.

7. A system as defined in claim 6, wherein the model recalibration interface comprises a plurality of user selectable parameter fields including a productivity index field and a correlation parameters field, and wherein the operations further comprise:
   calculating the well productivity index value that results in the model-predicted liquid rate at least substantially matching the field measured liquid rate responsive to user selection of the productivity index field; and
   iteratively modifying a value of at least one of a plurality of calibration reference measurements until the model-predicted liquid rate at least substantially matches the field measured liquid rate responsive to user selection of the correlation parameters field.

8. A system as defined in claim 7, wherein the calibration reference measurements comprise wellhead pressure (WHP), gas oil ratio (GOR), mass flow (Ql), and static bottom hole pressure (SBHP).

9. A system as defined in claim 7, wherein the operation of iteratively modifying a value of at least one of a plurality of calibration reference measurements is performed while maintaining the well productivity index value.

10. A system as defined in claim 7, wherein the operation of iteratively modifying a value of at least one of a plurality of calibration reference measurements includes iteratively reperforming the total system calibration on the well model utilizing corresponding iteratively modified values of the at least one of the plurality of calibration reference measurements responsive to user selection of both the productivity index field and the correlation parameters field.

11. A system as defined in claim 1, wherein the operations further comprise:
gathering a plurality of rate test measurements from a well production or injection rate test recorded within approximately six months of each other, to include:
gathering a set of at least three wellhead pressure (WHP) measurements,
gathering a set of at least three gas oil ratio (GOR) measurements,
gathering a set of at least three percent water cut (WC %) measurements, and
gathering a set of at least three liquid rate measurements;
determining an average wellhead pressure measurement value for the at least three wellhead pressure measurements;
determining an average gas oil ratio measurement value for the at least three gas oil ratio measurements;
determining an average percent water cut measurement value for the at least three percent water cut measurements; and
determining an average liquid rate measurement value for the at least three liquid rate measurements.

12. A system as defined in claim 1, wherein the operations further comprise:
analyzing a plurality of pressure surveys conducted periodically on a plurality of wells in a field associated with the well being modeled; and
determining an average static reservoir pressure for the well being modeled responsive to the analysis of the plurality of pressure surveys, the average static reservoir pressure determined from one or more pressure surveys having a pressure survey date as close as capable to an associated well production or injection rate test and having a surveyed well location as adjacent as capable to that of the well being modeled.

13. A system as defined in claim 1, wherein the operations further comprise:
providing a pressure-volume-temperature source selection criteria interface configured to receive a user selection of a source of pressure-volume-temperature test data used in generating the well model.

14. A system as defined in claim 13, wherein the pressure-volume-temperature source selection criteria comprises a plurality of user selectable pressure-volume-temperature selection criteria fields including a pressure-volume-temperature latest report date and source location option defining a first option field, a pressure-volume-temperature source based on well location option defining a second option field, and an external pressure-volume-temperature data option defining a third option field.

15. A system as defined in claim 14, wherein the first option field includes an input field providing user selection of a number of pressure-volume-temperature sources desired to be accessed, wherein the operations further comprise:
receiving a user input identifying user selection of the first option field and a user input indicating the user desired number of pressure-volume-temperature sources; and
retrieving report data for a number of latest reports matching the number of user desired sources, the latest reports being the most recent reports retrieved for the user desired number of sources closest to the well being modeled.

16. A system as defined in claim 14, wherein the operations further comprise:
modeling a plurality of wells each having a well area code; and
retrieving report data for each of the plurality of wells responsive to user selection of the second option field, the report data comprising a latest report having a same well area code as the respective well.

17. A system as defined in claim 1, wherein the operations further comprise:
retrieving a plurality of deviation survey point readings, the deviation survey point readings comprising a substantial number of measured depth versus true vertical depth readings; and
filtering the plurality of deviation survey point readings to thereby select an optimal number of between approximately 6-8 survey readings based on deviation angle.

18. A system as defined in claim 17, wherein the operation of filtering the plurality of deviation survey points is performed when the well being modeled has a substantial deviation angle, and wherein the operations further comprise:
selecting an optimal number of between approximately 2-3 survey readings when the well being modeled is substantially vertical.

19. A system as defined in claim 1, wherein the operations further comprise:
importing inside diameter and length data for each of at least substantially all tubing segments inside the wellbore of the well being modeled having a minimum length of approximately 10 feet, the imported data being devoid of inside diameter and length data for tubing segments having a length of approximately less than 10 feet to thereby reduce data importation requirements.

20. A system as defined in claim 1, wherein the operations further comprise:
determining a minimum casing diameter and locating tubing packer depth to thereby identify at least substantially all casing sections being in contact with fluid; and
importing data for the casing sections determined to be in contact with fluid, the imported casing sections data being substantially devoid of casing data for casing sections that are not in contact with fluid.

21. A system as defined in claim 1, wherein the operations further comprise:
determining tubing outside diameter and casing inside diameter throughout each wellbore section having fluid flowing in an annular space therebetween for the well being modeled.

22. A system as defined in claim 1, wherein the operations further comprise:
providing average rate test conditions to a simulator to calculate the model-predicted liquid rate, the rate test conditions comprising wellhead pressure (WHP), gas oil ratio (GOR), and percent water cut (WC %) measurements, an average of each of the rate test conditions provided to reduce an effect of measurement outliers when present.

23. A system for creating and calibrating production and injection well models for a reservoir, the system comprising:
a well performance modeling computer having a processor and memory comprising a non-transient computer readable medium or media, in communication with the processor to store software therein;
at least one database stored in memory accessible to the well performance modeling computer; and
a well performance modeling program stored in the memory of the well performance modeling computer to create and calibrate production and injection well models for a reservoir, the program including instructions that when executed by the well performance modeling computer cause the computer to perform the operations of:
providing user selection of a well to be modeled,
retrieving data from the at least one database to thereby develop a well model of the well,
performing a vertical flow correlation validation of a flow correlation used to model a pressure drop inside a well bore of a well being modeled, comprising modifying correlation performance by applying gravity and friction correction factors, calibrating the flow correlation responsive thereto so that flowing bottom-hole pressure predicted using the flow correlation at gauge depth matches a corresponding field measured value to thereby develop a model of the well, and
performing a total system calibration on the well model including:
providing well performance data to a simulator,
receiving a model-predicted liquid rate,
determining if a difference between the model-predicted liquid rate and corresponding field measured liquid rate is within a preselected value,
comparing a performed date of a valid productivity index (PI) test for the well to a latest work-over date for the well,
performing the following operations when the well has a valid productivity index (PI) test associated therewith having a performed date later than any well work-over date for the well:
decreasing a well productivity index value when the model-predicted liquid rate is greater than the field measured liquid rate, so that the model-predicted liquid rate is within the preselected value of the field measured liquid rate,
modifying flow correlation parameters to increase the model-predicted liquid rate when the model-predicted liquid rate is less than the field measured liquid rate, so that the model-predicted liquid rate is within the preselected value of the field measured liquid rate, performed without significantly adjusting the well productivity index value, and
performing the following operation when the well does not have a valid productivity index test associated therewith or has a productivity index test having a performed date earlier than a well work-over date for the well:
determining a productivity index value that when applied to the well model, results in a model-predicted liquid rate that at least substantially matches the field measured liquid rate.

24. A system as defined in claim 23, wherein the operation of decreasing a well productivity index value includes:
incrementally reducing the productivity index value and recalculating the model-predicted liquid rate until an absolute error between the model-predicted liquid rate and the field measured liquid rate is within the preselected value.

25. A system as defined in claim 23, wherein the operations further comprise:
providing a model recalibration interface, the model recalibration interface configured to receive a user selection of a calibration parameter to be changed so that the model-predicted liquid rate better matches the field measured liquid rate.

26. A system as defined in claim 25, wherein the model recalibration interface comprises a plurality of user selectable parameter fields including a productivity index field and a correlation parameters field, and wherein the operations further comprise:
calculating the well productivity index value that results in the model-predicted liquid rate at least substantially matching the field measured liquid rate responsive to user selection of the productivity index field; and
iteratively modifying a value of at least one of a plurality of calibration reference measurements until the model-predicted liquid rate at least substantially matches the field measured liquid rate responsive to user selection of the correlation parameters field.

27. Well performance modeling program product for creating and calibrating production and injection well models for a reservoir, the program product comprising a non-transitory computer readable medium embodying a set of instructions, that when executed by a computer, cause the computer to perform the operations of:
performing a vertical flow correlation validation of a multi-phase flow correlation used to model a pressure drop inside a well bore of a well to include calibrating the multi-phase flow correlation so that flowing bottom-hole pressure predicted using the flow correlation at gauge depth matches a corresponding field measured flowing bottom hole pressure value to thereby develop a well model of the well;
comparing a performed date of a valid productivity index (PI) test for the well to a latest work-over date for the well; and
performing a total system calibration on the well model including:
decreasing a well productivity index value for the well model responsive to a model-predicted liquid rate for the well being greater than a field measured liquid rate for the well and responsive to the valid productivity index test associated therewith having a performed date being later than any well work-over date for the well to thereby adjust the model-predicted liquid rate, so that the model-predicted liquid rate is within a preselected value of the field measured liquid rate, and
modifying flow correlation parameters for the well model to increase the model-predicted liquid rate responsive to the model-predicted liquid rate being less than the field measured liquid rate and responsive to the valid productivity index test associated therewith having the performed date being later than any well work-over date for the well to thereby adjust the model-predicted liquid rate, so that the model-predicted liquid rate is within the preselected value of the field measured liquid rate, performed without significantly adjusting the well productivity index value.

28. Program product as defined in claim 27, wherein the operation of performing a total system calibration on the well model includes:
providing well performance data to a simulator;
receiving a model-predicted liquid rate; and
determining if a difference between the model-predicted liquid rate and corresponding field measured liquid rate is within the preselected value.

29. Program product as defined in claim 27, wherein the operation of performing a total system calibration on the well model includes:
providing well performance data to a simulator;
receiving a model-predicted liquid rate;
determining if a difference between the model-predicted liquid rate and corresponding field measured liquid rate is within the preselected value; and
determining a productivity index value that when applied to the well model results in a model-predicted liquid rate that at least substantially matches the field measured liquid rate when the well does not have a valid productivity index test associated therewith or has a productivity index test having a performed date earlier than a well work-over date for the well.

30. Program product as defined in claim 27, wherein the operation of decreasing a well productivity index value includes:
incrementally reducing the productivity index value and recalculating the model-predicted liquid rate until an absolute error between the model-predicted liquid rate and the field measured liquid rate is within the preselected value.

31. Program product as defined in claim 30, wherein the absolute error is within approximately ±5%.

32. Program product as defined in claim 31, wherein the operations further comprise:
providing a model recalibration interface, the model recalibration interface configured to receive a user selection of a calibration parameter to be changed so that the model-predicted liquid rate better matches the field measured liquid rate.

33. Program product as defined in claim 32, wherein the model recalibration interface comprises a plurality of user selectable parameter fields including a productivity index field and a correlation parameters field, and wherein the operations further comprise:
calculating the well productivity index value that results in the model-predicted liquid rate at least substantially matching the field measured liquid rate responsive to user selection of the productivity index field; and
iteratively modifying a value of at least one of a plurality of calibration reference measurements until the model-predicted liquid rate at least substantially matches the field measured liquid rate responsive to user selection of the correlation parameters field.

34. Program product as defined in claim 33, wherein the calibration reference measurements comprise wellhead pressure (WHP), gas oil ratio (GOR), mass flow (Ql), and static bottom hole pressure (SBHP).

35. Program product as defined in claim 33, wherein the operation of iteratively modifying a value of at least one of a plurality of calibration reference measurements is performed while maintaining the well productivity index value.

36. Program product as defined in claim 33, wherein the operation of iteratively modifying a value of at least one of a plurality of calibration reference measurements includes iteratively reperforming the total system calibration on the well model utilizing corresponding iteratively modified values of the at least one of the plurality of calibration reference measurements responsive to user selection of both the productivity index field and the correlation parameters field.

37. Program product as defined in claim 27, wherein the operations further comprise:
gathering a plurality of rate test measurements from a well production or injection rate test recorded within approximately six months of each other, to include:
gathering a set of at least three wellhead pressure (WHP) measurements,
gathering a set of at least three gas oil ratio (GOR) measurements,
gathering a set of at least three percent water cut (WC %) measurements, and
gathering a set of at least three liquid rate measurements;
determining an average wellhead pressure measurement value for the at least three wellhead pressure measurements;
determining an average gas oil ratio measurement value for the at least three gas oil ratio measurements;
determining an average percent water cut measurement value for the at least three percent water cut measurements; and
determining an average liquid rate measurement value for the at least three liquid rate measurements.

38. Program product as defined in claim 27, wherein the operations further comprise:
analyzing a plurality of pressure surveys conducted periodically on a plurality of wells in a field associated with the well being modeled; and
determining an average static reservoir pressure for the well being modeled responsive to the analysis of the plurality of pressure surveys, the average static reservoir pressure determined from one or more pressure surveys having a pressure survey date as close as capable to an associated well production or injection rate test and having a surveyed well location as adjacent as capable to that of the well being modeled.

39. Program product as defined in claim 27, wherein the operations further comprise:
providing a pressure-volume-temperature source selection criteria interface configured to receive a user selection of a source of pressure-volume-temperature test data used in generating the well model.

40. Program product as defined in claim 39, wherein the pressure-volume-temperature source selection criteria comprises a plurality of user selectable pressure-volume-temperature selection criteria fields including a pressure-volume-temperature latest report date and source location option defining a first option field, a pressure-volume-temperature source based on well location option defining a second option field, and an external pressure-volume-temperature data option defining a third option field.

41. Program product as defined in claim 40, wherein the first option field includes an input field providing user selection of a number of pressure-volume-temperature sources desired to be accessed, wherein the operations further comprise:
receiving a user input identifying user selection of the first option field and a user input indicating the user desired number of pressure-volume-temperature sources; and retrieving report data for a number of latest reports matching the number of user desired sources, the latest reports being the most recent reports retrieved for the user desired number of sources closest to the well being modeled.

42. Program product as defined in claim 40, wherein the operations further comprise:
modeling a plurality of wells each having a well area code; and
retrieving report data for each of the plurality of wells responsive to user selection of the second option field, the report data comprising a latest report having a same well area code as the respective well.

43. Program product as defined in claim 27, wherein the operations further comprise:
retrieving a plurality of deviation survey point readings, the deviation survey point readings comprising a substantial number of measured depth versus true vertical depth readings; and
filtering the plurality of deviation survey point readings to thereby select an optimal number of between approximately 6-8 survey readings based on deviation angle.

44. Program product as defined in claim 43, wherein the operation of filtering the plurality of deviation survey points is performed when the well being modeled has a substantial deviation angle, and wherein the operations further comprise:
selecting an optimal number of between approximately 2-3 survey readings when the well being modeled is substantially vertical.

45. Program product as defined in claim 27, wherein the operations further comprise:
importing inside diameter and length data for each of at least substantially all tubing segments inside the wellbore of the well being modeled having a minimum length of approximately 10 feet, the imported data being devoid of inside diameter and length data for tubing segments having a length of approximately less than 10 feet to thereby reduce data importation requirements.

46. Program product as defined in claim 27, wherein the operations further comprise:
determining a minimum casing diameter and locating tubing packer depth to thereby identify at least substantially all casing sections being in contact with fluid; and
importing data for the casing sections determined to be in contact with fluid, the imported casing sections data being substantially devoid of casing data for casing sections that are not in contact with fluid.

47. Program product as defined in claim 27, wherein the operations further comprise:
determining tubing outside diameter and casing inside diameter throughout each wellbore section having fluid flowing in an annular space therebetween for the well being modeled.

48. Program product as defined in claim 27, wherein the operations further comprise:
providing average rate test conditions to a simulator to calculate the model-predicted liquid rate, the rate test conditions comprising wellhead pressure (WHP), gas oil ratio (GOR), and percent water cut (WC %) measurements, an average of each of the rate test conditions provided to reduce an effect of measurement outliers when present.

49. Well performance modeling program product for creating and calibrating production and injection well models for a reservoir, the program product comprising non-transitory computer readable medium embodying a set of instructions, that when executed by a computer, cause the computer to perform the operations of:
providing user selection of a well to be modeled;
receiving or retrieving data from one or more databases to thereby develop a well model of the well;
performing a vertical flow correlation validation of a flow correlation used to model a pressure drop inside a well bore of a well being modeled, comprising modifying correlation performance by applying gravity and friction correction factors, calibrating the flow correlation responsive thereto so that flowing bottom-hole pressure predicted using the flow correlation at gauge depth matches a corresponding field measured value to thereby develop a model of the well; and
performing a total system calibration on the well model including:
providing well performance data to a simulator,
receiving a model-predicted liquid rate,
determining if a difference between the model-predicted liquid rate and corresponding field measured liquid rate is within a preselected value,
comparing a performed date of a valid productivity index (PI) test for the well to a latest work-over date for the well,
performing the following operations when the well has a valid productivity index (PI) test associated therewith having a performed date later than any well work-over date for the well;
decreasing a well productivity index value when the model-predicted liquid rate is greater than the field measured liquid rate, so that the model-predicted liquid rate is within the preselected value of the field measured liquid rate,
modifying flow correlation parameters to increase the model-predicted liquid rate when the model-predicted liquid rate is less than the field measured liquid rate, so that the model-predicted liquid rate is within the preselected value of the field measured liquid rate, performed without significantly adjusting the well productivity index value, and
performing the following operation when the well does not have a valid productivity index test associated therewith or has a productivity index test having a performed date earlier than a well work-over date for the well:
determining a productivity index value that when applied to the well model results in a model-predicted liquid rate that at least substantially matches the field measured liquid rate.

50. Program product as defined in claim 49, wherein the operation of decreasing a well productivity index value includes:
incrementally reducing the productivity index value and recalculating the model-predicted liquid rate until an absolute error between the model-predicted liquid rate and the field measured liquid rate is within the preselected value.

51. Program product as defined in claim 49, wherein the operations further comprise:
providing a model recalibration interface, the model recalibration interface configured to receive a user selection of a calibration parameter to be changed so that the model-predicted liquid rate better matches the field measured liquid rate.

52. Program product as defined in claim 51, wherein the model recalibration interface comprises a plurality of user selectable parameter fields including a productivity index field and a correlation parameters field, and wherein the operations further comprise:
- calculating the well productivity index value that results in the model-predicted liquid rate at least substantially matching the field measured liquid rate responsive to user selection of the productivity index field; and
- iteratively modifying a value of at least one of a plurality of calibration reference measurements until the model-predicted liquid rate at least substantially matches the field measured liquid rate responsive to user selection of the correlation parameters field.

* * * * *

UNITED STATES PATENT AND TRADEMARK OFFICE
CERTIFICATE OF CORRECTION

PATENT NO. : 8,731,892 B2
APPLICATION NO. : 13/196525
DATED : May 20, 2014
INVENTOR(S) : Al-Shammari It is certified that error appears in the above-identified patent and that said Letters Patent is hereby corrected as shown below:

In the Claims

Column 17, Line 65, Claim 1 "tivity index (Pt)" should read --tivity index (PI)--.

Signed and Sealed this
Twelfth Day of August, 2014

Michelle K. Lee
*Deputy Director of the United States Patent and Trademark Office*